(12) United States Patent
Fogwill et al.

(10) Patent No.: US 11,733,216 B2
(45) Date of Patent: Aug. 22, 2023

(54) MATCHING THERMALLY MODULATED VARIABLE RESTRICTORS TO CHROMATOGRAPHY SEPARATION COLUMNS

(71) Applicant: Waters Technologies Corporation, Milford, MA (US)

(72) Inventors: Michael O. Fogwill, Uxbridge, MA (US); Joseph D. Michienzi, Plainville, MA (US); Geoff Gerhardt, Woonsocket, RI (US); James P. Murphy, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 115 days.

(21) Appl. No.: 16/917,178

(22) Filed: Jun. 30, 2020

(65) Prior Publication Data

US 2020/0333301 A1 Oct. 22, 2020

Related U.S. Application Data

(63) Continuation of application No. 14/773,786, filed as application No. PCT/US2014/013985 on Jan. 31, 2014, now abandoned.

(Continued)

(51) Int. Cl.
*B01D 15/08* (2006.01)
*B01D 15/16* (2006.01)
(Continued)

(52) U.S. Cl.
CPC ............ *G01N 30/32* (2013.01); *B01D 15/08* (2013.01); *B01D 15/161* (2013.01);
(Continued)

(58) Field of Classification Search
CPC .... B01D 15/08; B01D 15/161; B01D 15/163; B01D 15/40; G01N 30/32; G01N 30/8658; G01N 2030/025; G01N 2030/324
See application file for complete search history.

(56) References Cited

U.S. PATENT DOCUMENTS 4,414,857 A 11/1983 Brazhnikov et al.
4,845,985 A 7/1989 Berger
(Continued)

FOREIGN PATENT DOCUMENTS

EP 0346565 A2 12/1989
WO 2006078634 A2 7/2006
(Continued)

OTHER PUBLICATIONS

Examination Report in European Patent Application No. 14764.098.1 dated Sep. 25, 2020.
(Continued)

*Primary Examiner* — Benjamin L Lebron
(74) *Attorney, Agent, or Firm* — Schmeiser, Olsen & Watts LLP

(57) ABSTRACT

Thermally modulated variable restrictors used in chromatography systems enable independent control of system pressure and linear velocity of a compressible mobile phase passing through a chromatography column. A method for configuring a chromatography system with independent control of system pressure and mass flow rate of a compressible mobile phase includes determining a type of chromatography separation column to be used in the chromatography system, matching a thermally modulated variable restrictor to the type of chromatography separation column for use together during operation of the chromatography system, and bundling the chromatography column with its (Continued)

matching thermally modulated variable restrictor for distribution as a single package.

11 Claims, 6 Drawing Sheets

Related U.S. Application Data

(60) Provisional application No. 61/777,110, filed on Mar. 12, 2013, provisional application No. 61/777,065, filed on Mar. 12, 2013.

(51) Int. Cl.
 *B01D 15/40*    (2006.01)
 *G01N 30/32*    (2006.01)
 *G01N 30/86*    (2006.01)
 *G01N 30/02*    (2006.01)

(52) U.S. Cl.
 CPC ........... *B01D 15/163* (2013.01); *B01D 15/40* (2013.01); *G01N 30/8658* (2013.01); *G01N 2030/025* (2013.01); *G01N 2030/324* (2013.01)

(56) References Cited

U.S. PATENT DOCUMENTS

| | | |
|---|---|---|
| 4,962,662 A | 10/1990 | Berger |
| 4,982,597 A | 1/1991 | Berger |
| 5,271,903 A | 12/1993 | Durst et al. |
| 5,336,869 A | 8/1994 | Kumar |
| 5,340,475 A | 8/1994 | Cortes et al. |
| 6,183,635 B1 | 2/2001 | Klee et al. |
| 6,294,088 B1 | 9/2001 | Allington et al. |
| 6,557,575 B1 | 5/2003 | Gerhardt et al. |
| 6,865,926 B2 | 3/2005 | O'Brien et al. |
| 6,878,909 B2 | 4/2005 | Bergstrom et al. |
| 10,006,890 B2 | 6/2018 | Fogwill et al. |
| 2004/0237627 A1 | 12/2004 | Jochum, Jr. |
| 2005/0121392 A1 | 6/2005 | Hoffman |
| 2006/0054558 A1 | 3/2006 | Jones et al. |
| 2006/0186029 A1 | 8/2006 | Granger et al. |
| 2008/0121576 A1 | 5/2008 | Gerhardt et al. |
| 2008/0302423 A1 | 12/2008 | Gerhardt et al. |
| 2009/0165873 A1 | 7/2009 | Chordia et al. |
| 2009/0173146 A1 | 7/2009 | Pursch et al. |
| 2009/0321356 A1 | 12/2009 | Gerhardt et al. |
| 2010/0101411 A1 | 4/2010 | Tipler |
| 2011/0113866 A1 | 5/2011 | Finlay |
| 2011/0233299 A1 | 9/2011 | Berger et al. |
| 2012/0118049 A1 | 5/2012 | Tipler |
| 2012/0305092 A1 | 12/2012 | Corso et al. |
| 2016/0018366 A1 | 1/2016 | Fogwill et al. |
| 2016/0018367 A1 | 1/2016 | Fogwill et al. |
| 2016/0069845 A1 | 3/2016 | Fogwill et al. |

FOREIGN PATENT DOCUMENTS

| | | |
|---|---|---|
| WO | 2010102194 A1 | 9/2010 |
| WO | 2013032833 A1 | 3/2013 |

OTHER PUBLICATIONS

Examination Report in European Patent Application No. 14800388.2 dated Sep. 30, 2020.
White, et al. "Analysis of Pharmacuticals and Other Solutes of Biochemical Importance by Supercrititcal Fluid Chromatography," Jan. 1988, Journal ofHigh Resolution Chromatography and Chromatography Communications, vol. 11, pp. 94-98.
Berger, T.A. and C. Toney, "Linear Velocity Control in Capillary Supercritical Fluic Chromatography by Restrictor Temperature Programming", Journal of Chromatography, 1989, pp. 157-167, vol. 465.
Page, et al., "Restrictor plugging in off-line supercritical fluid extraction of environmental samples, Microscopic, chemical and spectroscopic evaluations", Journal of Supercritical Fluids, 1999, pp. 257-270.
Pinkston, J. David "Supercritical Fluid Chromatography/Mass Spectrometry" Analysis with Supercritical Fluids Extraction and Chromatography, 1992, pp. 151-177.
International Preliminary Report on Patentability in PCTUS2014/013153 dated Sep. 24, 2015.
International Search Report & Written Opinion in PCT/US2014/013153 dated May 5, 2014.
International Search Report and Written Opinion in PCT/US2014/038027 dated Mar. 27, 2015.
International Preliminary Report on Patentability in PCT/US2014/038027 dated Dec. 3, 2015.
Search Report in European Patent Application No. 14800388.2 dated Nov. 29, 2016.
Examination Report in European Patent Application No. 14800388.2 dated Jun. 5, 2019.
Search Report in European Patent Application No. 14764098.1 dated Sep. 23, 2016.
Examination Report in European Patent Application No. 14764.098.1 dated Jan. 7, 2019.
Non-Final Office Action in U.S. Appl. No. 14/782,476 dated Oct. 23, 2017.
Notice of Allowance in U.S. Appl. No. 14/782,476 dated Feb. 22, 2018.
Non-Final Office Action in U.S. Appl. No. 14/773,780 dated Aug. 10, 2017.
Final Office Action in U.S. Appl. No. 14/773,780 dated Jan. 24, 2018.
Non-Final Office Action in U.S. Appl. No. 14/773,780 dated Jul. 24, 2018.
Non-Final Office Action in U.S. Appl. No. 14/773,780 dated Mar. 4, 2019.
Non-Final Office Action in U.S. Appl. No. 14/773,780 dated Oct. 2, 2019.
Final Office Action in U.S. Appl. No. 14/773,780 dated Apr. 16, 2020.
Restriction Requirement in U.S. Appl. No. 14/773,786 dated Aug. 30, 2018.
Non-Final Office Action in U.S. Appl. No. 14/773,786 dated Dec. 7, 2018.
Final Office Action in U.S. Appl. No. 14/773,786 dated Apr. 2, 2019.
Non-Final Office Action in U.S. Appl. No. 14/773,786 dated Sep. 10, 2019.
Final Office Action in U.S. Appl. No. 14/773,786 dated Apr. 30, 2020.
Baek, et al. "Wireless induction heating in a microfluidic device for cell lysis," Lab on a Chip, vol. 10, Jan. 2010, pp. 909-917.
Lord, et al., "Tapers and restrictors for capillary electrochromatography and capillary electrochromatography-mass spectrometry," Journal of Chromatography, 1997, pp. 9-16, vol. 768.
Olesik, Susan V. and L.A. Pekay, "A Model for Quantitatively Describing Linear Velocity Programming in Capillary SFC," Chromatographia, Jan. 1990, vol. 29, No. ½, Germany, pp. 69-75.
International Search Report and Written Opinion in PCT/US2014/013985 dated May 16, 2014.
International Preliminary Report on Patentability in PCT/US2014/013985 dated Sep. 24, 2015.
Berger, T.A. and B.S. Todd, "Packed Column Supercritical Fluid Chromatography of Oligoethers using Pure Carbon Dioxide with Flame Ionization and Ultraviolet Detection", Chromatographia, Dec. 2001, pp. 777-781, vol. 54, No. 11/12.
Berger, T.A., "Simple Correction for Variable Post Column Split Ratios using Pure Carbon Dioxide in Packed Column Supercritical Fluid Chromatography with Independent Pressure and Flow Control", Chromatographia, Dec. 2001, pp. 783-788, vol. 54, No. 11/12.
Pyo, Dongjin, "Programmed Two-stage Flow Controller for Supercritical Fluid Chromatography", Analyst, Jun. 1994, pp. 1315-1318, vol. 119.

(56) References Cited

OTHER PUBLICATIONS

Pyo, Dongjin, "Temperature-controlled Restrictor for UV Detection in Capillary Supercritical Fluid Chromatography", Bull. Korean Chem. Soc., 2006, pp. 1429-1432, vol. 27, No. 9.

Greibrokk, et al., "Techniques and Applications in Supercritical Fluid Chromatography", Journal of Chromatography, 1987, pp. 429-441, vol. 394.

Li, Jian Jun and Kevin B. Thurbide, "Dynamic control of split flow in packed column supercritical fluid chromatography using dual resistively heated restrictors", J. Sep. Sci. 2009, pp. 2469-2475, vol. 32.

Li, Jian Jun and Kevin B. Thurbide, "Novel pressure control in supercritical fluid chromatography using a resistively heated restrictor", Can. J. Chem. 2009, pp. 490-495, vol. 87.

MATCHING THERMALLY MODULATED VARIABLE RESTRICTORS TO CHROMATOGRAPHY SEPARATION COLUMNS

RELATED APPLICATION

This application claims the benefit of and priority to U.S. patent application Ser. No. 14/773,783, filed Sep. 9, 2015, titled "Matching Thermally Modulated Variable Restrictors to Chromatography Separation Columns," which claims the benefit of and priority to PCT Patent Application No. PCT/US2014/013985, filed Jan. 31, 2014, titled "Matching Thermally Modulated Variable Restrictors to Chromatography Separation Columns," which claims the benefit of and priority to co-pending U.S. provisional application No. 61/777,110, filed Mar. 12, 2013, titled "Matching Thermally Modulated Variable Restrictors to Chromatography Separation Columns," and to co-pending U.S. provisional application No. 61/777,065, filed Mar. 12, 2013, titled "Thermally Modulated Variable Restrictor," the entireties of which applications are incorporated by reference herein.

FIELD OF THE INVENTION

The invention relates generally to chromatography systems. More specifically, the invention relates to matching thermally modulated variable restrictors to chromatography separation columns for use together in chromatography systems employing compressible mobile phases.

BACKGROUND

Supercritical fluid chromatography (SFC) systems employ a compressible mobile phase, often carbon dioxide, as a carrier fluid. Separations performed by such chromatography systems require independent control over the mobile phase flow rate and system pressure in order to maintain a constant linear velocity through the separation column. This decoupling of mobile phase flow rate and system pressure is often achieved with back pressure regulators (BPRs) when analytical-scale separation columns are employed. BPRs, however, can contribute significant dead volume to the chromatographic system, and, therefore, capillary-scale or open tubular columns, with column IDs (internal diameter) generally ranging between 100 and 530 µm, cannot use this method of independently controlling mobile phase flow rate and system pressure without significantly reducing chromatographic efficiency.

Accordingly, in capillary-scale separations, fixed restrictors are more commonplace. Use of fixed restrictors, however, does not enable the decoupling of the mobile phase flow rate from the system pressure. For example, when a density program is applied, the mobile phase flow rate (i.e., the linear velocity across the column) increases with increased system pressure. This increase in linear velocity can result in a loss of chromatographic efficiency as the separation progresses.

One solution involves using heated variable linear restrictors instead. Current designs of heated variable linear restrictors comprise a tube with a small ID heated along its full length. The tube receives the compressible mobile phase from the separation column. Adjustments to the temperature of the mobile phase within the linear restrictor operate to control the linear velocity of the mobile phase within the column. Such linear restrictors, however, are often susceptible to plugging because the mobile phase gradually depressurizes as it travels through the linear restrictor. As the mobile phase depressurizes, it loses its ability to dissolve analytes travelling with it, and these analytes begin to precipitate out of solution within the linear restrictor. This precipitation can result in analyte loss (i.e., problems with quantitation) and changes in the efficacy of the linear restrictor over time, which could eventually lead to complete plugging and need for replacement.

Other types of heated restrictors operate by heating a short region with a small ID (less than 10 µm) at the egress end of the restrictor. However, the high linear velocity of the mobile phase through this short region with the small ID limits the energy transfer from the heater to the mobile phase. Hence, these types of heated restrictors often require very high temperatures (approximately 600° C.) for only moderate changes in system pressure.

Maintaining a constant linear velocity through the separation column in SFC, however, requires independent control over column flow rate and system pressure, regardless of column geometry. However, the wide variety of commercially available SFC column geometries results in a wide range of mobile phase flow rates (i.e., uL/min for a capillary-scale column to mL/min for an analytical-scale column). Consequently, the optimum mobile phase flow rate for each type of separation column is significantly different. For example, the optimum mobile phase flow rate for a preparative-scale separation column is many orders of magnitude greater than the optimum flow rate for a long, open tubular column. Currently, no single device is able to provide independent control over system pressure and column flow rate for all available types of SFC columns. BPRs are effective at independently controlling system pressure and mobile phase linear velocity in SFC over a broad flow rate range, but, as previously described, their design contributes appreciable dead volume to the chromatographic system, and, therefore, prevents their use with smaller ID separation columns, such as capillary-scale or open tubular columns. Heated restrictors can be used to independently control system pressure and the mobile phase flow rate, but the range of mobile phase flow rates over which these devices are effective at controlling system pressure is relatively narrow.

SUMMARY

In one aspect, the invention features a method for configuring a chromatography system with independent control of system pressure and mass flow rate of a compressible mobile phase. The method comprises determining a type of chromatography separation column to be used in the chromatography system, matching a thermally modulated variable restrictor to the type of chromatography separation column for use together during operation of the chromatography system, and bundling the chromatography column with its matching thermally modulated variable restrictor for distribution together as a single unit.

In another aspect, the invention features a kit for a chromatography system comprising a chromatography separation column to be used in the chromatography system, and a thermally modulated variable restrictor matched to the type of chromatography separation column for use together during operation of the chromatography system.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
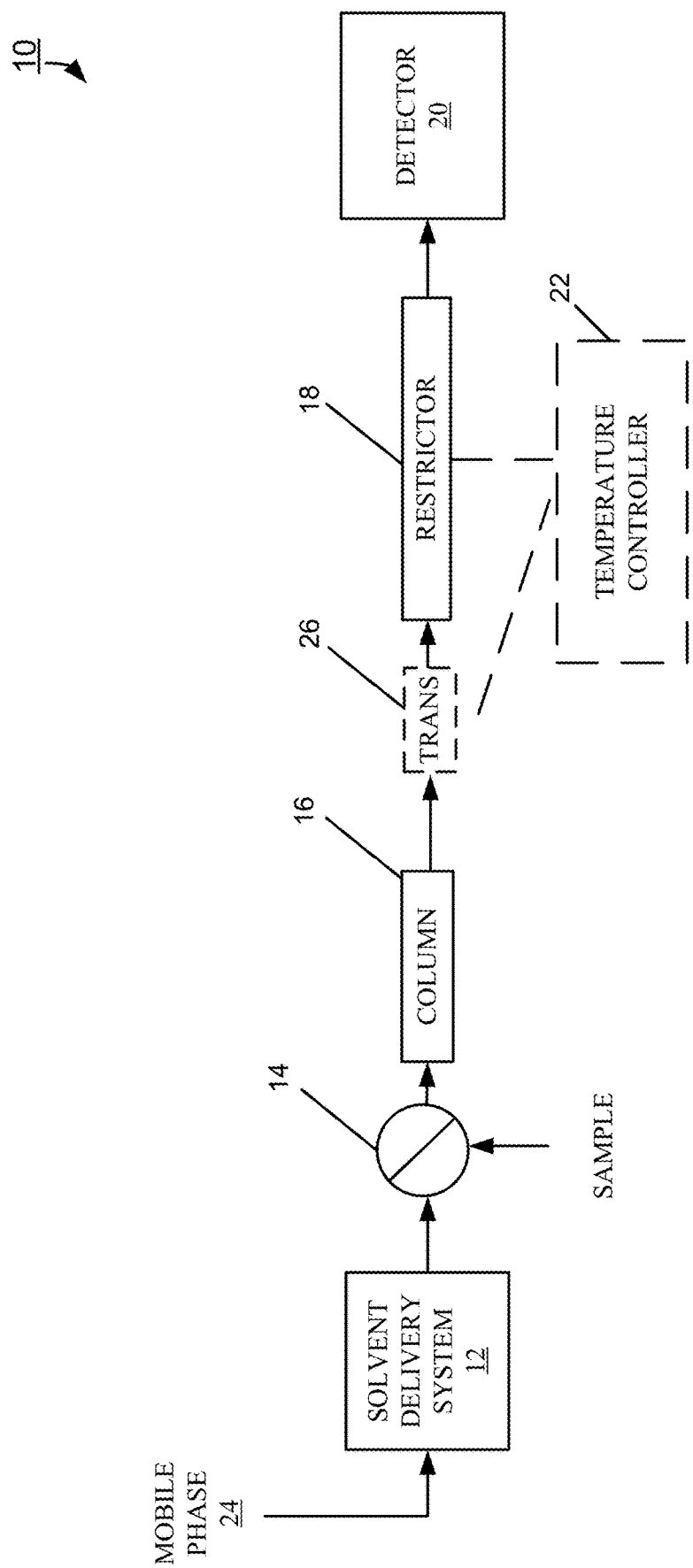
FIG. 1 is a block diagram of an embodiment of a $CO_2$-based chromatography system including a thermally modulated variable restrictor.

Carbon dioxide-based chromatography systems can use various embodiments of thermally modulated variable restrictors described herein to independently control system pressure and mobile phase linear velocity through the column without introducing significant dead volume to the system. To avoid premature analyte precipitation, these thermally modulated variable restrictors have shorter decompression distances than those of conventional heated restrictors. The decompression distance corresponds to length along the restrictor over which the compressible mobile phase can expand from the fluid phase to gas. A short decompression distance thus maintains an appreciable mobile phase density through the fluidic channel of the restrictor as long as possible to prevent analyte precipitation and consequential plugging.

In brief overview, the thermally modulated variable restrictors described herein confine the decompression distance to a short region (called the restrictor tip) disposed at the outlet end of a fluidic channel embodied within a restrictor body. Embodiments of the restrictor body include tubes and microfluidic substrates (or tiles). The restrictor tip has one or more egress openings that are smaller than the internal diameter of the fluidic channel and, thus, restrict the flow of the mobile phase passing through the fluidic channel. Embodiments of the restrictor tip include a short length of straight, small ID tubing, a tapered restrictor, a pinched restrictor, a fritted restrictor, an integral restrictor, or a crimped restrictor (e.g., a restrictor tip crimped onto the end of the heated restrictor body, or a restriction formed by crimping a metal tube that reduces its ID). This restrictor tip can be replaceable or permanently affixed to the restrictor body with the fluidic channel. The outlet of the chromatography column couples directly to the inlet end of the fluidic channel, through which the mobile phase enters the restrictor.

A heating element applies heat to a subsection of the fluidic channel with the relatively large ID (greater than or equal to 100 μm), where the linear velocity of the mobile phase is relatively low. A slowly moving mobile phase provides sufficient time for an energy transfer from the heating element to the mobile phase. As the heating element heats the mobile phase in the subsection of the fluidic channel, the effective restriction increases. The density of the mobile phase decreases as its temperature rises. This decrease in density causes a volumetric expansion and a significant increase in the linear velocity of the mobile phase. The increase in linear velocity across the restrictor tip causes an increase in restriction in the system. This restriction operates to maintain a minimum density of the mobile phase, preventing the mobile phase in the fluidic channel from evaporating to gas until it reaches the egress opening of the restrictor tip, where decompression occurs. Surprisingly and advantageously, relatively low temperatures, for example, ranging between 150° C. and 250° C., are capable of producing a restrictive backpressure sufficient to control the flow rate of the mobile phase through the column, while maintaining the mobile phase substantially in fluid form within the restrictor body until the mobile phase reaches the restrictor tip.

Because the decompression distance of the variable restrictor is relatively short, being substantially limited to the short region of the restrictor tip, the fluidic channel is relatively unsusceptible to plugging. Further, should a replaceable restrictor tip clog or plug, the heated restrictor body of the thermally modulated variable restrictor would remain intact, while only the restrictor tip, typically far less expensive than the heated restrictor body, would need replacing.

Instead of, or in addition to the heating element, other embodiments of thermally modulated variable restrictors can have a cooling element, for example, a Peltier device or other thermoelectric cooling device or liquid $CO_2$, to cool the subsection of the fluidic channel with the relatively large ID. The cooling element can rapidly cool the variable restrictor to its initial temperature, to further reduce the linear velocity through sub-ambient cooling. Alternatively, the cooling element can be used to freeze the $CO_2$ in place and form a plug in the system. Liquid nitrogen, for example, can be used to produce this result. Freezing the $CO_2$ in place can be a useful technique in a system with a split configuration, where the frozen $CO_2$ serves to shut off the flow through one of the split legs.

The various embodiments of thermally modulated variable restrictors described herein can be adapted for different types of $CO_2$-based chromatography systems, for example, SFC, operating with preparative, semi-preparative, analytical, or capillary-scale packed-bed columns or open tubular columns. The columns can be prepared in metallic, fused silica, or polymeric tubes or in metallic, ceramic, silica, glass, or polymeric microfluidic platforms of various IDs. Because of the wide array of available column designs and geometries, an optimum mobile phase flow rate for each column is significantly different. For example, the optimum mobile phase flow rate for a preparative-scale separation column is many orders of magnitude greater than the optimum flow rate for a long, open tubular column.

Advantageously, the construction of a thermally modulated variable restrictor can be matched to a particular chromatography separation column design in order to optimize performance when a chromatographic separation employs the matched set of column and restrictor. Separation columns (e.g., for SFC) and their matching restrictors can be bundled, marketed, packaged, sold, and distributed together in kits. This precise matching of a thermally modulated variable restrictor to a particular chromatography separation column assures users that their backpressure mechanism is accurately tuned to produce a constant linear velocity of the mobile phase through the column, while providing independent control over the mobile phase flow rate and system pressure. In addition, bundling a chromatography separation column with its matched thermally modulated variable restrictor circumvents the time-consuming and necessary processes of design, assembly, and calibration when configuring a chromatography system with a thermally modulated variable restrictor for use with a particular separation (e.g., for SFC) column.

FIG. 1 shows an embodiment of a carbon dioxide-based chromatography system 10 for separating a sample into its constituents. The chromatography system 10 includes a solvent delivery system 12 in fluidic communication with a sample injector 14 (also called a sample manager). The sample injector 14 is in fluidic communication with a separation column 16. A thermally modulated variable restrictor 18 is coupled between the column 16 and a detector 20.

The chromatographic separation occurs under predetermined pressure conditions, which are either static or programmed dynamic pressure conditions. The solvent delivery system 12 can operate in a constant-pressure mode or in a constant-flow mode. In the constant-pressure mode, the solvent delivery system 12 produces the system pressure in the chromatography system 10 with one or more pumps (not shown) in accordance with, for example, a density program. The thermally modulated variable restrictor 18 can be used to control the mobile phase flow rate when the solvent delivery system 12 is in the constant-pressure mode. When in the constant-flow mode, the system 12 provides a set mass flow rate of solvent. This mass flow rate can be programmable. When the solvent delivery system 12 is in the constant-flow mode, the thermally modulated variable restrictor 18 can be used to control the system pressure.

Fluidically coupled to the solvent delivery system 12 are one or more sources of solvents that are used during the course of a chromatographic run. From these sources of solvent, the solvent delivery system 12 draws a compressible mobile phase fluid 24 and moves the mobile phase to the injector 14.

Preferably, the solvents include a fluid (e.g., $CO_2$) that is in a gaseous state at ambient/room temperature and atmospheric pressure. When a sample is run with pure $CO_2$, the solvent has gained appreciable density (i.e. solvating power) at elevated pressure and/or temperature. In addition to the $CO_2$, the mobile phase can contain a modifier (e.g., methanol) and ternary additives (e.g., pH controllers).

The sample injector 14 is in fluidic communication with a sample source from which the injector acquires a sample (i.e., the material under analysis) and introduces the sample to the mobile phase arriving from the solvent delivery system 12. Examples of samples include complex mixtures of proteins, protein precursors, protein fragments, reaction products, and other compounds, to list but a few. From the sample injector 14, the mobile phase, which includes the injected sample, passes to and through the chromatography separation column 16.

The separation column 16 is adapted to separate the various components (or analytes) of the sample from each other at different rates as the mobile passes through, and to elute the analytes (still carried by the mobile phase) from the column 16 at different times. Embodiments of the separation column 16 include a variety of sizes (e.g., preparative, semi-preparative, analytical, or capillary-scale packed-bed columns or open tubular columns) and a variety of preparations (e.g., in conventional metallic, fused silica, or polymeric tubes, or in metallic, ceramic, silica, glass, or polymeric microfluidic platforms or substrates of various IDs).

The thermally modulated variable restrictor 18, in general, decouples the mass flow rate of the mobile phase from the system pressure. For instance, when the solvent delivery system 12 controls the system pressure, the thermally modulated variable restrictor 18 uses temperature to restrict and control the mass flow of the mobile phase through the separation column 16. Alternatively, when the solvent delivery system 12 controls the mass flow of the mobile phase (in the constant-flow mode), the thermally modulated variable restrictor 18 can use temperature to control the system pressure.

An inlet end of the restrictor 18 is in fluidic communication with the outlet of the separation column 16, from which the restrictor 18 receives the eluent (i.e., the mobile phase with the separated analytes). The outlet end of the thermally modulated variable restrictor 18 couples to the detector 20. A heated region of the restrictor 18 heats the mobile phase passing through that region. Controlling the temperature of the mobile phase within the restrictor 18 operates to control the system pressure and, thus, the linear velocity of the mobile phase passing through the separation column 16. Embodiments of the thermally modulated variable restrictor 18 can be fashioned as one or more sections of tubing or as a channel in a metallic, ceramic, silica, glass, or polymeric microfluidic device. Implementations of the thermally modulated variable restrictor 18 can be made of metal, fused silica, silica, glass, or polymeric tubing or microfluidic devices of various geometries and cross sectional aspect ratios.

In one embodiment, the detector 20 is a gas chromatography type detector, such as a Flame Ionization Detector (FID). Other embodiments of the detector 20 include, but are not limited to, a mass spectrometer and an evaporative light scattering detector. The output of the detector 20 can be, for example, a voltage signal or a current that is applied, for example, to an X-Y plotter or some type of chart recorder, which graphs the detector output over time, or is supplied as input to a chromatography data system. Other types of detectors can be used in connection with the thermally modulated variable restrictors described herein. In general, the output of the detector depends on the type of detector.

A temperature controller 22 can optionally be in communication with the thermally modulated variable restrictor 18 to determine the current temperature of the mobile phase within the restrictor 18 and, if necessary, to adjust the temperature applied to the heated region in order to attain a target pressure. A predetermined mapping of temperature to pressure, as described below in connection with FIG. 9, can be used to determine the necessary temperature adjustment. In another embodiment, the temperature controller 22 comprises an active feedback loop with a pressure transducer 26 disposed in the fluidic path downstream of the column 16 (upstream of the variable restrictor) for closed-loop control.

Figure 2:
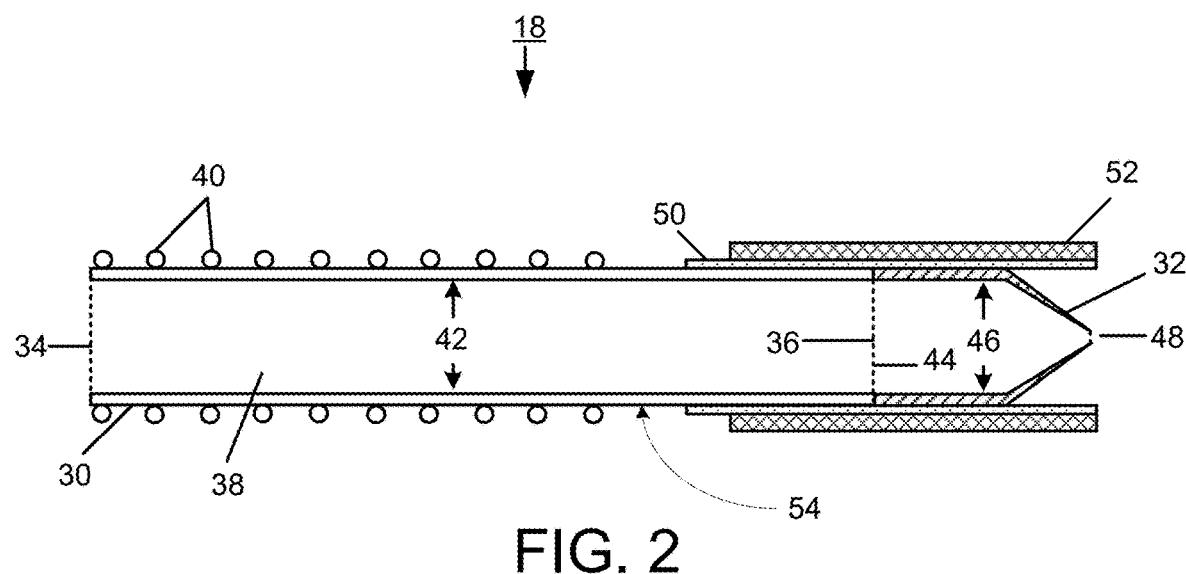
FIG. 2 is a cross-sectional view of one embodiment of the thermally modulated variable restrictor.

FIG. 2 shows an example embodiment of a thermally modulated variable restrictor 18 that can be employed in the chromatography system 10 of FIG. 1. The restrictor 18 comprises a restrictor body 30 (implemented as a tube) coupled to a tapered restrictor tip 32. The restrictor body 30 has an inlet end 34 (which couples directly to the outlet of the separation column 16 of FIG. 1), an outlet end 36, and a bore 38 extending therethrough that provides a fluidic channel for the mobile phase flowing into the inlet end 34 from the column 16. A heating element 40, for example, a Nichrome wire with a polyimide coating, coils around a short section of the restrictor body 30. In this example, the heating element 40 begins at the inlet end 34 of the restrictor body 30 and ends before reaching the restrictor tip 32, and the restrictor tip 32 is unheated. The restrictor tip 32 can be heated without departing from the principles described herein. Often, the restrictor tip 32 resides within a heated region of a detector (e.g., a flame ionization detector, evaporative light scattering, mass spectrometry). In such instances, the restrictor tip is held at a constant temperature, typically greater than the temperature of the restrictor body. Notwithstanding, the heating of the restrictor tip 32 may have negligible effect on temperature-pressure relationship because the linear velocity of the mobile phase through the restrictor tip 32 is so great as to present little time for further energy transfer.

Compared to the tip orifice, the ID 42 of the bore 38 is relatively large so that the mass flow rate of the mobile phase through the restrictor body 30 is slow enough to facilitate energy transfer from the heating element 40 to the mobile phase. The outlet end 36 of the restrictor body 30 abuts the inlet end 44 of the restrictor tip 32. The ID 46 of the restrictor tip 32 matches the ID 42 of the restrictor body 30 at the inlet end 44 and tapers to a narrow opening 48 smaller than the ID 42. This taper provides the restriction on the mobile phase flow.

A tubing connector, comprised of an intermediate tube 50 and an outer tube 52, is one example of an attachment mechanism for coupling the restrictor body 30 to the restrictor tip 32. The intermediate tube 50 surrounds the outlet end 36 of the restrictor body 30 and the restrictor tip 32; the outer tube 52 (preferably stainless steel) surrounds a majority portion of the intermediate tube 50. As such, the tubing connector protects the end 36 of the restrictor body 30. Annular crimps (not shown) can permanently affix the outer and intermediate tubes to each of the restrictor body 30 and restrictor tip 32. Examples of such annular crimps are described in International application no. PCT/US12/51974, filed Aug. 23, 2012, titled "Liquid Chromatography Conduit Assemblies having High Pressure Seals", the entirety of which application is incorporated by reference herein.

Other attachment mechanisms can be employed with departing from the principles described herein. For example, a union (not shown) can be used to connect the restrictor body 30 to the restrictor tip 32. Rather than join within the tubing connector, the union can join the restrictor body 30 to the restrictor tip 32 outside of the unheated zone, for example, at point 54. The connection can be non-destructively detachable, enabling the replacement of plugged restrictor tips, and prolonging the useful life of the restrictor body.

During a chromatography run, the mobile phase received by the restrictor 18 from the column 16 preferably remains predominantly liquefied throughout its passage through the restrictor body 30. Because of the relative shortness of the heated section, the mobile phase does not decompress before reaching the restrictor tip 32. At the outlet 48 of the restrictor tip 32, the mobile phase transitions to gas and evaporates, leaving the analytes to be passed on to the detector 20 (FIG. 1). Advantageously, the analytes carried by the liquefied mobile phase tend not precipitate from the mobile phase within the restrictor body 30 (and, consequently, this tendency reduces the likelihood of plugging).

In general, thermally modulated variable restrictors have a relatively tight range of mobile phase flow rates that they can effectively regulate, and are preferably matched to a particular separation column to maintain the desired mass flow rate through the column. For example, to maintain a flow rate of 1.5 mL/min of dense carbon dioxide through a 3.0 mm ID separation column 16, a restrictor 18 comprised of a restrictor body 30, with a heated region of 50 cm in length and a 100 μm ID, followed by a short restrictor tip 32, with a 100 μm ID tapered to approximately 30 μm, is effective at controlling the system pressure to achieve the desired flow rate. As another example, to maintain a flow rate of 4.0 mL/min of dense carbon dioxide through a 4.6 mm ID separation column 16, a restrictor 18 comprised of a restrictor body 30, with a heated region of 100 cm in length and a 150 μm ID, followed by a short restrictor tip 32, with a 150 μm ID tapered to approximately 40 μm, is effective at controlling the system pressure to achieve the desired flow rate.

Figure 3:
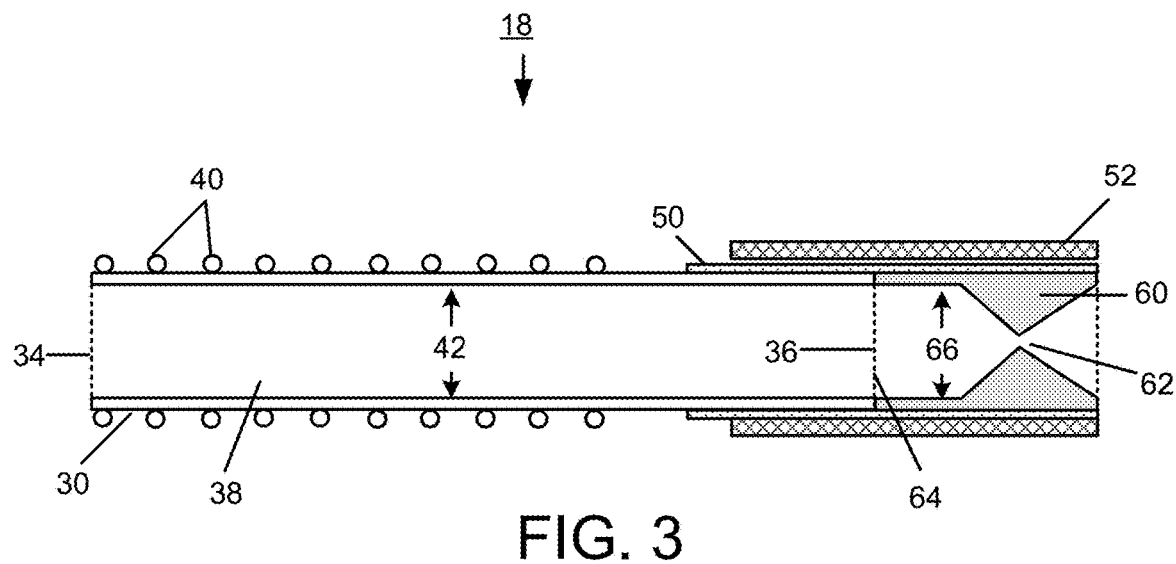
FIG. 3 is a cross-sectional view of another embodiment of the thermally modulated variable restrictor.

FIG. 3 shows another embodiment of a thermally modulated variable restrictor 18 with the restrictor body 30 of the FIG. 2 coupled to a pinched restrictor tip 60, also referred to as a converging-diverging restrictor. The outlet end 36 of the restrictor body 30 abuts the inlet end 64 of the restrictor tip 60. The ID 66 of the restrictor tip 60 matches the ID 42 of the restrictor body 30 at the inlet end 64, pinches to a narrow opening 62 smaller than the ID 42, and widens towards the outlet end of the restrictor tip 60. This pinch provides the restriction on the mobile phase flow. A laser process can produce the pinch in the restrictor tip 60 by decreasing the ID 66 from opposite ends of the tip 60 towards the narrow opening 62, while the dimension of the outer diameter (OD) of the restrictor tip 60 remains unchanged. The tubing connector described in connection with FIG. 2, for example, can couple the restrictor body 30 to the restrictor tip 60.

Figure 4:
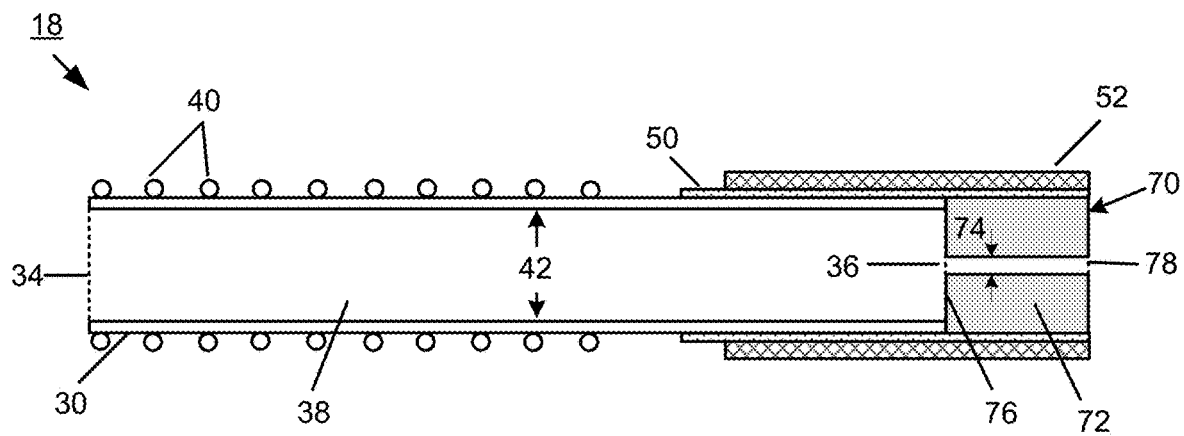
FIG. 4 is a cross-sectional view of another embodiment of the thermally modulated variable restrictor.

FIG. 4 shows another embodiment of a thermally modulated variable restrictor 18 with the restrictor body 30 of FIG. 2 coupled to a linear restrictor tip 70 comprised of a short section of tubing 72 having a smaller ID 74 than the ID 42 of the restrictor body 30. The outlet end 36 of the restrictor body 30 abuts the inlet end 76 of the restrictor tip 70. The outlet end of the restrictor tip 70 has a single narrow opening 78 (the size of the ID 74). The tubing connector described in connection with FIG. 2, for example, can couple the restrictor body 30 to the restrictor tip 70.

Figure 5:
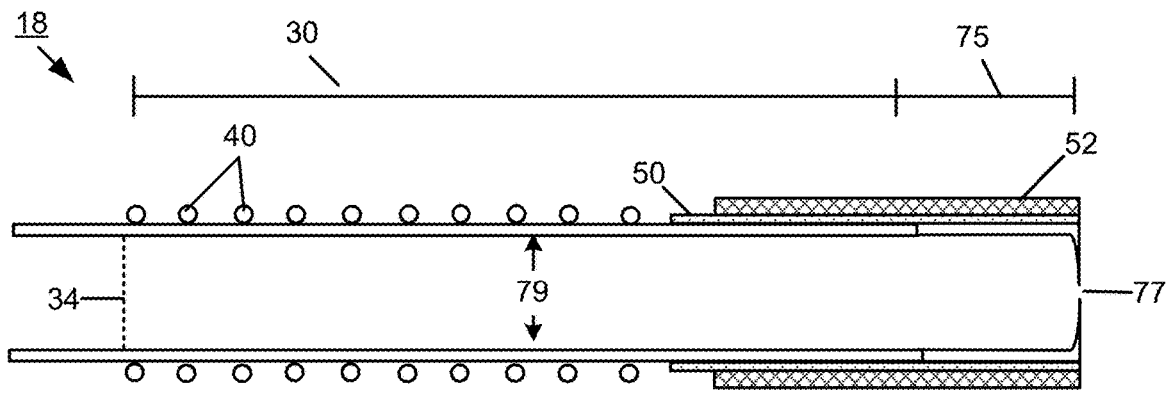
FIG. 5 is a cross-sectional view of another embodiment of the thermally modulated variable restrictor.

FIG. 5 shows another embodiment of a thermally modulated variable restrictor 18 with the restrictor body 30 and an integral restrictor tip 75. The restrictor tip 75 is formed by melting the end of a fused silica capillary closed and sanding back the closed end until a small orifice 77 is formed. The orifice 77 has a smaller ID than the ID 79 of the restrictor body 30. The end of the restrictor tip 75 abuts the end of the restrictor body 30. Although this type of restrictor is called an integral restrictor, the restrictor tip 75 does not necessarily need to be integral to the heated region (i.e., the restrictor body).

Figure 6:
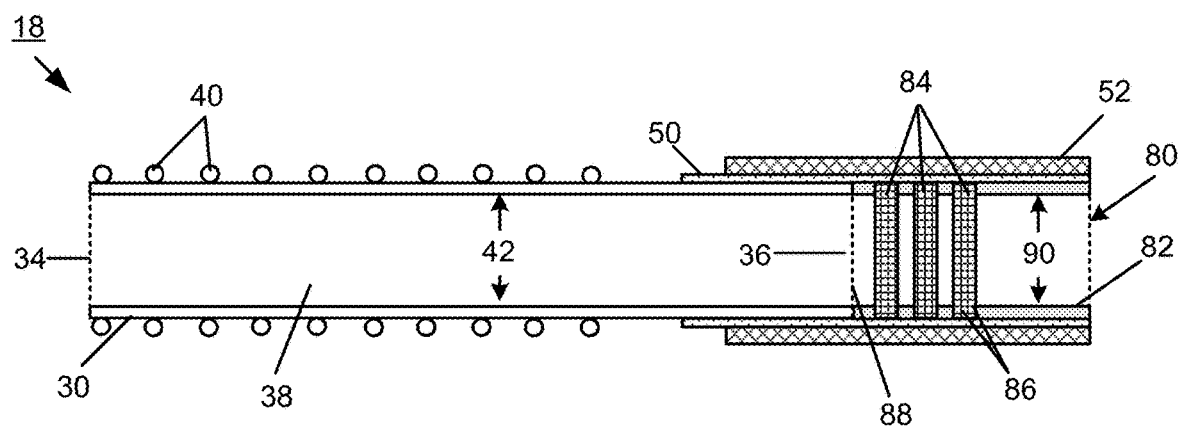
FIG. 6 is a cross-sectional view of another embodiment of the thermally modulated variable restrictor.

Each of the restrictor tips 32, 60, 70, and 75 of FIG. 2, FIG. 3, FIG. 4, and FIG. 5, respectively, is relatively immune to plugging from analyte precipitation because of their short decompression distances. Each of such restrictor tips has a single narrow opening, which can be susceptible to plugging from a small solid particle that becomes lodged in the orifice. FIG. 6 shows an embodiment of a thermally modulated variable restrictor 18 that overcomes the susceptibility of a single narrow opening.

The thermally modulated variable restrictor 18 of FIG. 6 includes the restrictor body 30 of FIG. 2 coupled to a fritted restrictor tip 80. The restrictor tip 80 includes tubing 82 with one or more frits 84 packed therein. Each frit 84 in the tubing 82 is a porous element, made of stainless steel or other inert metal or plastic, having multiple small openings or pores 86 through which can pass the mobile phase with the sample. In other embodiments, a frit 84 can be formed using a continuous bed of, for example, sintered silica particles, silica particles bonded with polymer, entirely a porous polymer fixed in place, or a monolithic silica structure formed by using silicates. Each pore 86 of a frit 84 provides a different decompression path for the mobile phase. Whereas any given pore of a frit 84 may become blocked by a small particle, the unlikelihood of every pore becoming blocked ensures that the restrictor tip 80 is effectively immune from plugging. The outlet end 36 of the restrictor body 30 abuts the inlet end 88 of the restrictor tip 80. The ID 90 of the restrictor tip 80 matches the ID 42 of the restrictor body 30. The tubing connector described in connection with FIG. 2, for example, can couple the restrictor body 30 to the restrictor tip 80.

Figure 7:
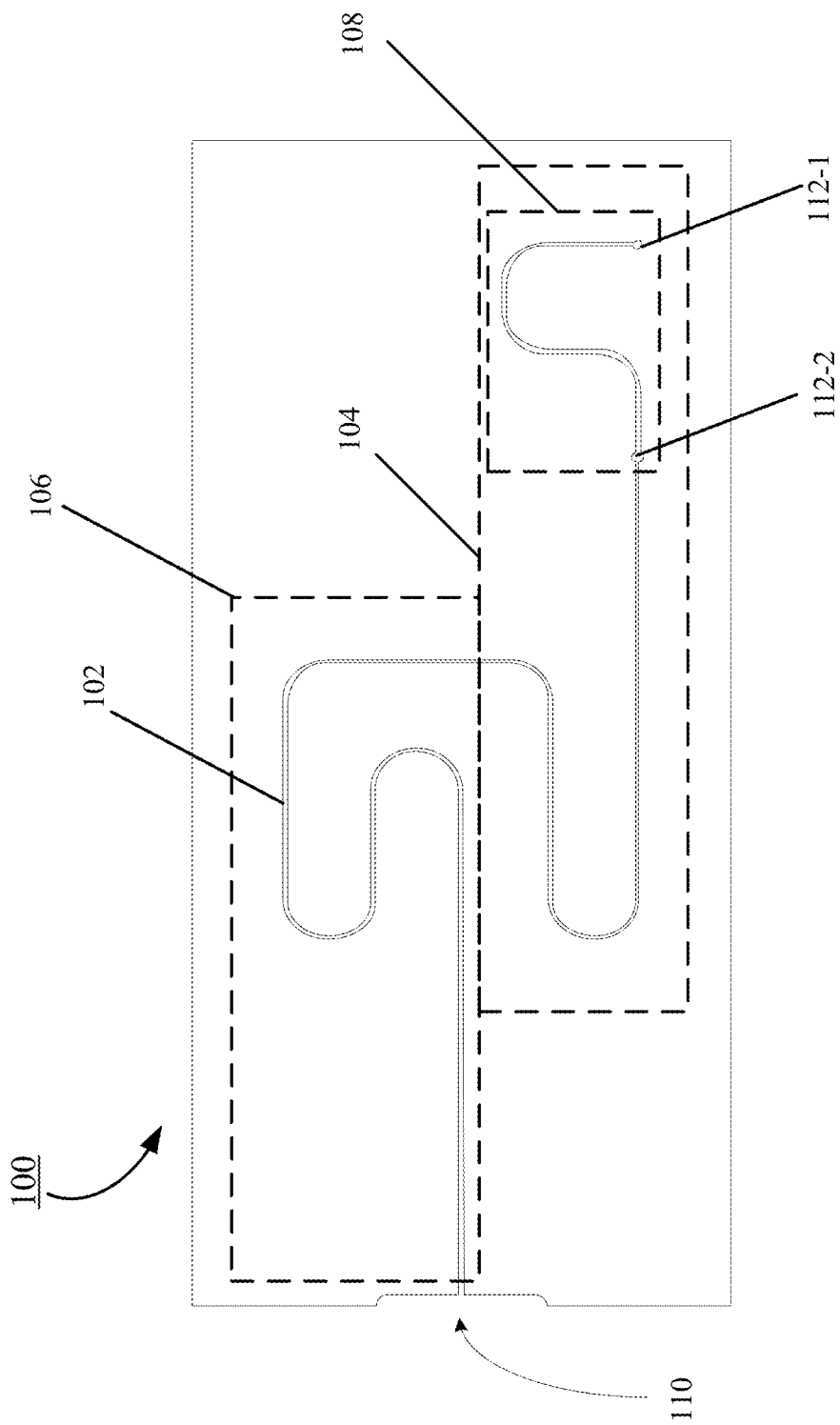
FIG. 7 is a top view of a microfluidic substrate (or tile) having a fluidic channel, a subsection of which embodies a restrictor body of a thermally modulated variable restrictor.

FIG. 7 shows an example of a microfluidic substrate (or tile) 100 used to implement an embodiment of a restrictor body. The microfluidic substrate 100 is generally rectangular, flat, and thin (approx. 0.050") and has a multilayer construction. Example construction materials for the microfluidic substrate 100 include metallic (e.g., titanium, stainless steel), ceramic, glass, and polymeric. For protein samples, the microfluidic substrate 100 is preferably a High-Temperature Co-fired Ceramic (HTCC), which provides suitably low levels of loss of sample because of attachment of sample to walls of conduits in the substrate. Example implementations of microfluidic substrates are described in U.S. application Ser. No. 12/282,225, filed Mar. 19, 2007, titled "Ceramic-based Chromatography Apparatus and Methods for Making Same," the entirety of which is incorporated herein by reference. The microfluidic substrate 100 can be housed in a microfluidic cartridge, as described in International application no. PCT/US2010/026342, filed Mar. 5, 2010, titled "Electrospray Interface to a Microfluidic Substrate," the entirety of which is incorporated herein by reference.

Formed within the layers of the microfluidic substrate 100 is a serpentine fluidic channel 102 for transporting the mobile phase. The fluidic channel 102 can be, for example, lasered, etched, embossed, or machined into the substrate layers. The fluidic channel 102 passes through two regions of the microfluidic substrate 100, including a column region 104 and a restrictor body region 106. The column region 104 can include a trap region 108. Apertures 112-1 and 112-2 open into the fluidic channel 102 at opposite ends of the trap region 108. The fluidic aperture 112-2 at the "downstream" end of the trap region 108 is optionally used as a fluidic outlet aperture, for example, during loading of the trap region 108, and is optionally closed to fluid flow, for example, during injection of a loaded sample from the trap region 108 into the fluidic channel 102.

The fluidic channel 102 terminates at an opening 110 in an edge of the microfluidic substrate 100. A restrictor tip, such as any of those described in connection with FIG. 2, FIG. 3, FIG. 4, and FIG. 6, can be brought into fluidic communication with this opening 110 to restrict the flow of the mobile phase flowing through the fluidic channel 102. Techniques for interfacing a restrictor tip to an opening at the edge of a microfluidic substrate 100 are described in the aforementioned International application no. PCT/US2010/026342. Alternatively, the fluidic channel 102 can terminate at an opening in a side of the substrate 100. Other types of restrictor tips can be integral to the microfluidic substrate, for example, a frit can be embedded into the microfluidic substrate at the egress end of the fluidic channel 102, or the opening 110 can be fashioned to be smaller than the ID of the fluidic channel 102. In contrast to the externally attached restrictor tips, the integral restrictors cannot be removed and replaced.

The sizes of the regions 104, 106, 108, and the shape and length of the fluidic channel 102 within each region, are merely illustrative examples. Other embodiments of microfluidic platforms 100 can have the restrictor body region 106 and column region 104 on different interconnected tiles, similar to that illustrated in the aforementioned International application no. PCT/US2010/026342.

Figure 8:
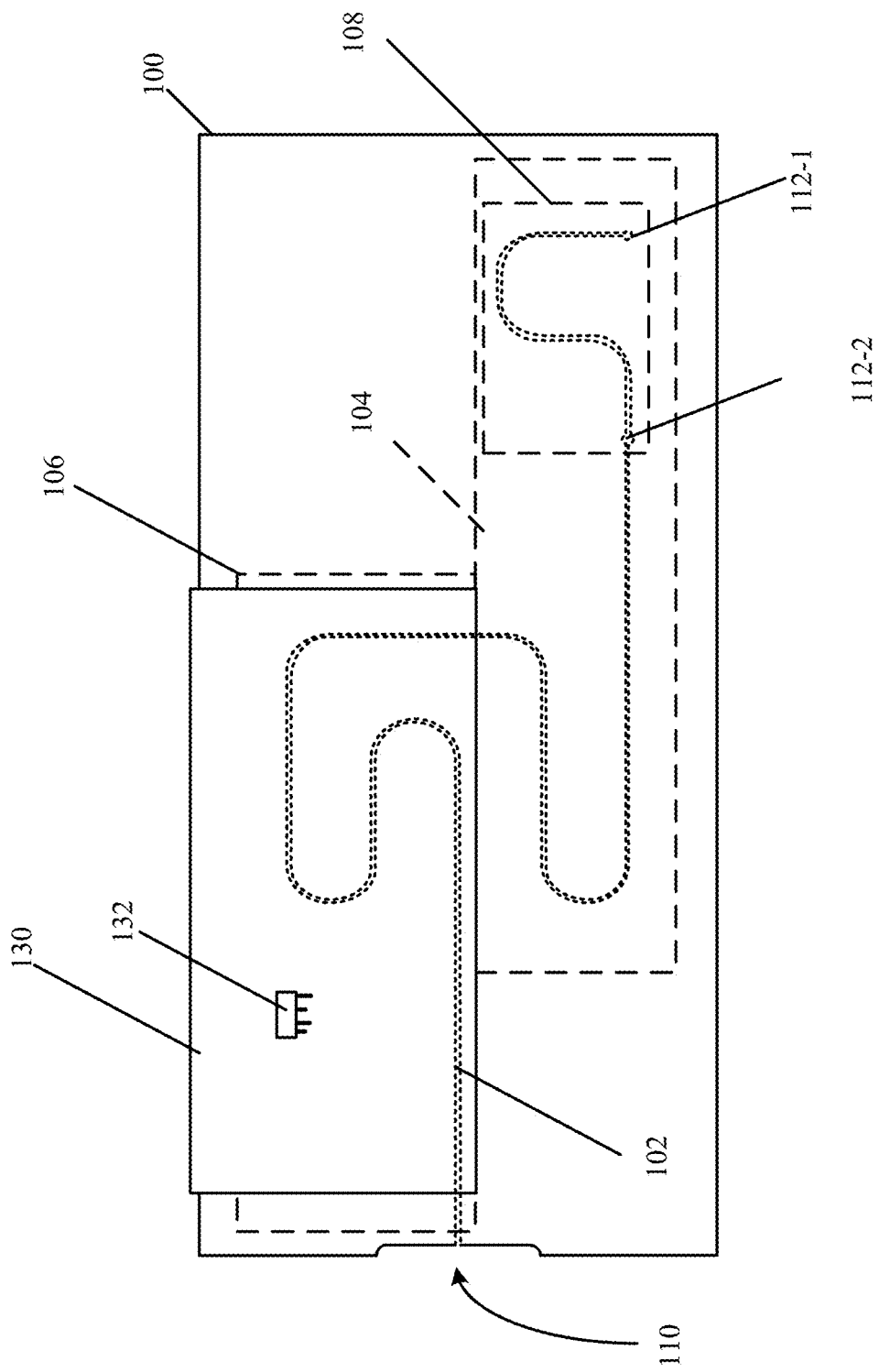
FIG. 8 is a top view of the microfluidic substrate of FIG. 7 with a heater disposed on a surface thereof to heat a subsection of the fluidic channel within the microfluidic substrate.

In addition, the restrictor body and column regions 104, 106, whether implemented on the same or on different substrates, can be two independently controlled thermal regions. FIG. 8 shows an embodiment of a microfluidic substrate 100 with a flex circuit heater 130 disposed on a side surface of the substrate 100. The multi-layer flex circuit assembly 130 covers the restrictor body region 106 of FIG. 7. A portion of the flex circuit assembly 130 can fold over the edge on onto the opposite side of the microfluidic substrate 100.

Immediately below the surface covered by the circuit assembly 130 is the region 106 of the fluidic channel 102 corresponding to the restrictive body. One layer of the flex circuit assembly 130 includes resistive traces that generate heat upon the passage of electrical current. The heat passes through the surface of the substrate 100 into the mobile phase flowing through the fluidic channel 102 within the restrictor body region 106. Mounted to the flex circuit assembly 130 can be a temperature sensor 132 to measure the applied temperature. Another heater (not shown) can cover and independently control the temperature of the separation column region 104. In another embodiment, the heating of the restrictor body region 106 can be achieved using a deposited layer of ferromagnetic material and an inductive heater.

Figure 9:
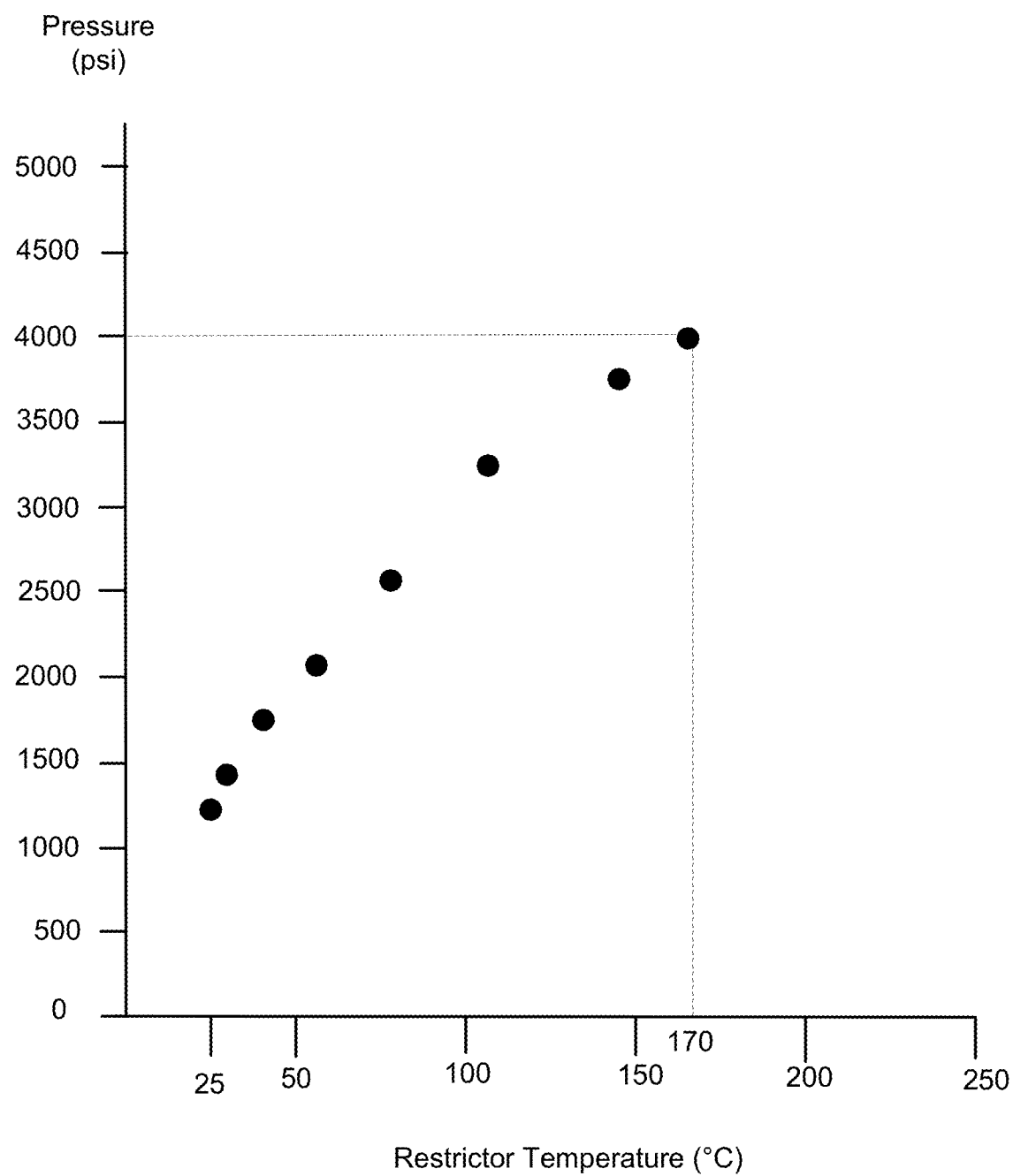
FIG. 9 is a plot of system pressure versus restrictor temperature at a constant mobile phase flow rate.

FIG. 9 graphically illustrates an example of the operation of the thermally modulated variable restrictor 18 depicted in FIG. 3 for a constant mobile phase flow rate. The restrictor 18 associated with this graph was constructed of fused silica tubing with a heated region having a length of 100 cm and an ID 42 of 150 µm ID. The restrictor tip 60 was constructed of a fused silica tubing having a short length with an ID 66 of 150 µm pinched to an ID of 39 µm. The graph shows system pressure increasing from 1200 psi to 4000 psi because of the restrictor temperature increasing from ambient temperature to 170° C. This construction of variable restrictor proved effective at controlling the system pressure at a flow rate of 4.0 mL/min of dense carbon dioxide, which is appropriate for a 4.6 mm ID SFC column. In contrast, conventional variable restrictor designs with heated restrictor tips require temperatures in the range of 500 to 600° C. to achieve a similar level of restriction to what the thermally modulated variable restrictor 18 can achieve at less than 200° C.

In addition, the mapping illustrated by the graph of FIG. 9, between restrictor temperatures and system pressures, can serve as a guide for making adjustments to temperature in order to achieve a target system pressure. For example, the temperature controller 22 of FIG. 2 can use a measured temperature to determine the current system pressure, determine whether this system pressure is at a desired present level, and, if not, adjust the temperature accordingly. Each variable restrictor matched to a particular type of column can have its own particular temperature-pressure chart for use in precisely controlling system pressure with restrictor temperatures. Considerations taken when seeking to match a thermally modulated variable restrictor to a particular type of separation column include, but are not limited to, any one or combination of the following: a desired mass flow rate of the compressible mobile phase through the chromatography separation column, the restrictor tip for matching to the desired mass flow rate of the mobile phase (i.e., the size of its opening or type of opening), a target system pressure, the temperature-pressure characteristic of the variable restrictor, the length of the variable restrictor to be heated, the temperature range over which to operate the variable restrictor in order to regulate system pressure, and the size of an internal diameter of the variable restrictor.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for configuring a chromatography system comprising:
    receiving a target system pressure and a desired mass flow rate of a compressible mobile phase for the chromatography system;
    selecting a type of a chromatography separation column to be used in the chromatography system based on the target system pressure and the desired mass flow rate;
    constructing a thermally modulated variable restrictor with a structural configuration including:
        a restrictor body having a fluidic channel with an inlet end that receives a compressible mobile phase from the chromatography separation column and an outlet end through which the mobile phase leaves the fluidic channel;
        a restrictor tip disposed adjacent the restrictor body at the outlet end of the fluidic channel, the restrictor tip having an egress opening that is smaller than an internal diameter of the fluidic channel; and
        a heating element thermally coupled to a subsection of the fluidic channel between the inlet and outlet ends to heat the compressible mobile phase passing through that subsection of the fluidic channel;
    wherein the structural configuration of the thermally modulated variable restrictor that maintains the desired mass flow rate and the target system pressure when the thermally modulated variable restrictor is attached to the selected chromatography separation column during operation of the chromatography system; and
    attaching the chromatography separation column to the thermally modulated variable restrictor to form a single unit for distribution.

2. The method of claim 1, further comprising receiving a desired temperature-pressure characteristic of the thermally modulated variable restrictor.

3. The method of claim 1, further comprising determining a temperature range over which to operate the thermally modulated variable restrictor in order to regulate system pressure.

4. The method of claim 1, wherein determining the structural configuration of the thermally modulated variable restrictor includes determining a length of the thermally modulated variable restrictor to be heated.

5. The method of claim 1, wherein the determining the structural configuration of the thermally modulated variable restrictor includes determining a size of an internal diameter of the thermally modulated variable restrictor.

6. The method of claim 1, wherein the single unit achieves a constant linear velocity of mobile phase through the chromatography separation column during operation of the chromatography system.

7. A method comprising:
    configuring a chromatography system based on a desired performance of the chromatography system, wherein the configuring includes:
        constructing a thermally modulated variable restrictor with structural features including:
            a restrictor body having a fluidic channel with an inlet end that receives a compressible mobile phase from a chromatography separation column and an outlet end through which the mobile phase leaves the fluidic channel;
            a restrictor tip disposed adjacent the restrictor body at the outlet end of the fluidic channel, the restrictor tip having an egress opening that is smaller than an internal diameter of the fluidic channel; and
            a heating element thermally coupled to a subsection of the fluidic channel between the inlet and outlet ends to heat the compressible mobile phase passing through that subsection of the fluidic channel;
        wherein the structural features of the thermally modulated variable restrictor that maintain the desired performance when the thermally modulated restrictor is attached to the chromatography separation column during operation of the chromatography system, the chromatography separation column being selected based on the desired performance of the chromatography system.

8. The method of claim 7, wherein the desired performance is selected from the group consisting of: a desired mass flow rate of the compressible mobile phase through the chromatography separation column, a constant linear velocity of the compressible mobile phase through the chromatography separation column, a control of the compressible mobile phase flow rate, a target system pressure, and a combination thereof.

9. The method of claim 7, wherein the structural features of the thermally modulated variable restrictor include: a size of an opening of the thermally modulated variable restrictor, a length of the thermally modulated variable restrictor to be heated, and a size of an internal diameter of the thermally modulated variable restrictor.

10. The method of claim 7, wherein the restrictor body comprises tubing to provide the fluidic channel, and wherein the heating element includes a wire coiled around the tubing.

11. The method of claim 7, wherein the restrictor body comprises a microfluidic substrate within which the fluidic channel is formed.

* * * * *